United States Patent [19]

Cinotti

[11] Patent Number: 5,078,959
[45] Date of Patent: Jan. 7, 1992

[54] REACTOR BLOCK OF A FAST REACTOR, WITH AN INNER CYLINDRICAL VESSEL FOR REMOVING THE RESIDUAL POWER OF THE CORE BY NATURAL CIRCULATION

[75] Inventor: Luciano Cinotti, Genoa, Italy

[73] Assignee: Ansaldo S.p.A., Genoa, Italy

[21] Appl. No.: 412,003

[22] Filed: Sep. 25, 1989

[30] Foreign Application Priority Data

Sep. 27, 1988 [IT] Italy .................. 12556 A/88

[51] Int. Cl.$^5$ .............................................. G21C 15/18
[52] U.S. Cl. ...................................... 376/299; 376/405
[58] Field of Search ............... 376/299, 298, 405, 404, 376/403, 203, 204

[56] References Cited

U.S. PATENT DOCUMENTS

| | | | |
|---|---|---|---|
| 3,893,886 | 7/1975 | Aubert et al. | 376/404 |
| 3,932,214 | 1/1976 | Aubert et al. | 376/405 |
| 4,022,656 | 5/1977 | Durston et al. | 376/290 |
| 4,043,866 | 8/1977 | Durston | 376/405 |
| 4,478,784 | 10/1984 | Burelbach | 376/298 |
| 4,487,742 | 12/1984 | Bret | 376/298 |
| 4,492,667 | 1/1985 | Cabrillat et al. | 376/405 |
| 4,592,888 | 6/1986 | Cornu et al. | 376/299 |
| 4,780,270 | 10/1988 | Hundal et al. | 376/299 |

FOREIGN PATENT DOCUMENTS

| | | |
|---|---|---|
| 2195822 | 3/1974 | France . |
| 2246027 | 4/1975 | France . |
| 2254093 | 7/1975 | France . |
| 2189339 | 10/1987 | United Kingdom . |

*Primary Examiner*—Daniel D. Wasil
*Attorney, Agent, or Firm*—Fleit, Jacobson, Cohn, Price, Holman & Stern

[57] ABSTRACT

The invention refers to a solution for the reactor block of a sodium-cooled fast reactor, fitted with an inner cylindrical vessel. This forms the mechanical structure for hydraulic separation 7 between the primary sodium hot header 2 and the cold header 3. The hot header is located in the area above the core, and the cold header, having a larger volume and an annular shape, is located all around the hot header. According to the invention the primary pumps and intermediate exchangers 8 are immersed in the cold header 3. The intermediate heat exchangers 8 are of the straight tube bundle type, with primary sodium outside the tubes, and they are hydraulically connected to the hot header by a transverse duct 13, solid with the inner cylindrical vessel 7, and mechanically sealed where it interfaces with the heat exchanger. This mechanical sealing system is made as close against the heat exchanger, as possible, so that the heat exchanger is removable.

4 Claims, 3 Drawing Sheets

FIG.2
FIG.3
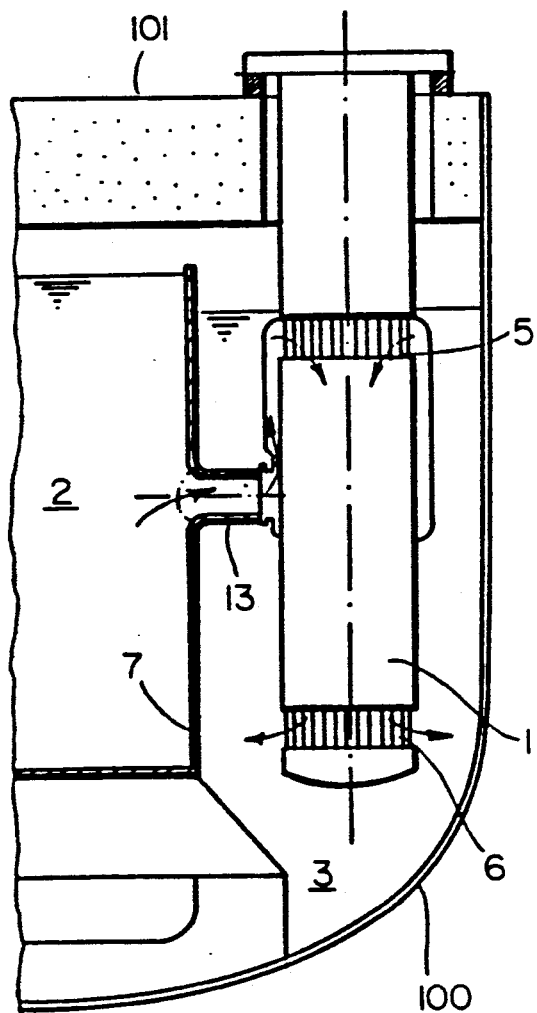
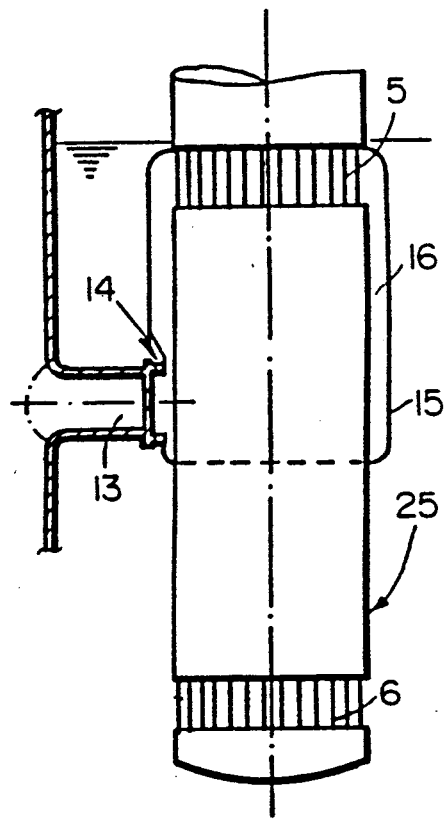

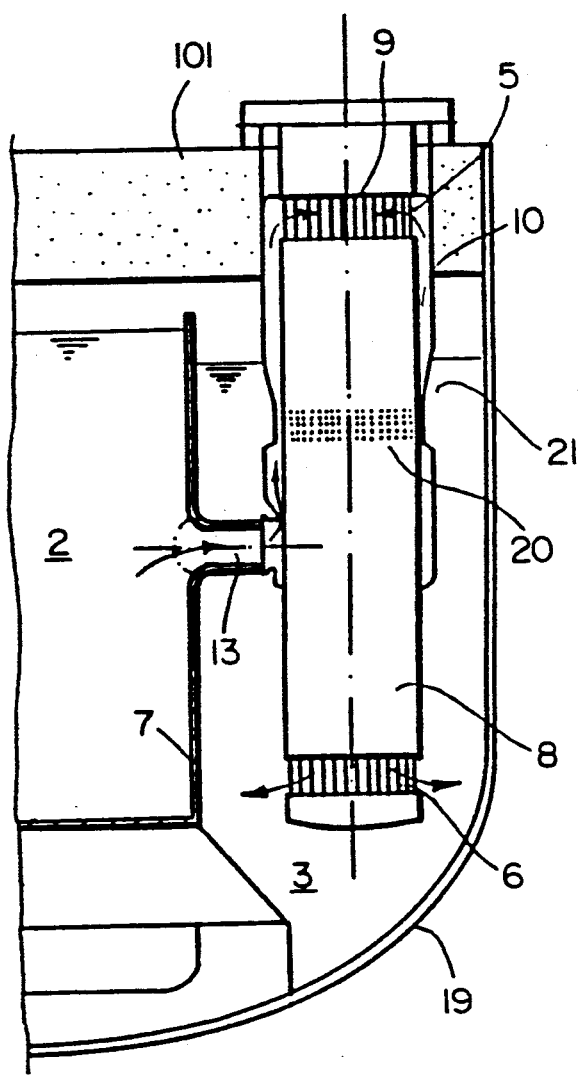
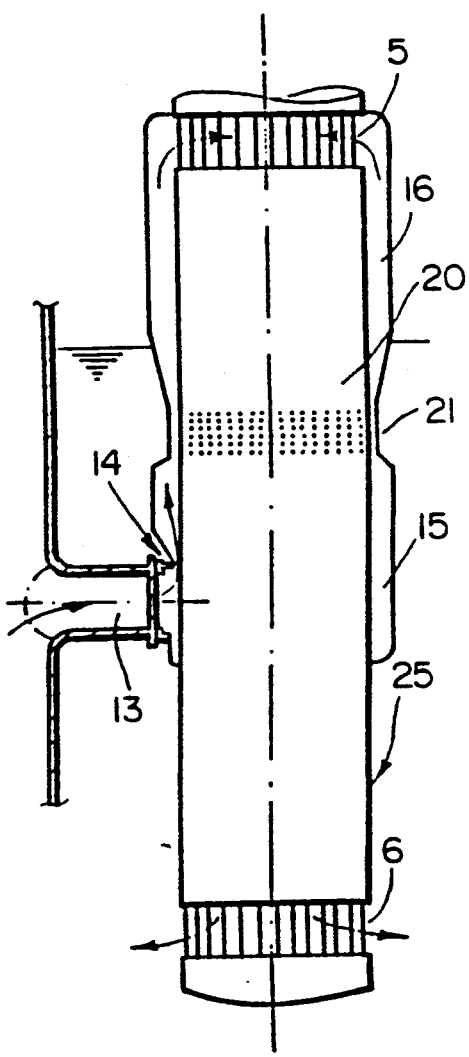

REACTOR BLOCK OF A FAST REACTOR, WITH AN INNER CYLINDRICAL VESSEL FOR REMOVING THE RESIDUAL POWER OF THE CORE BY NATURAL CIRCULATION

BACKGROUND OF THE INVENTION

The invention refers to a fast reactor block with an inner cylindrical vessel for the evacuation of the residual power from the core by natural circulation. It is well-known that in fast reactors of the vessel type it is necessary to separate hydraulically the hot header from the cold header, in order to create a closed circuit for cooling the core.

In currently adopted solutions, the hydraulic separation structure consists of a suitably shaped metal shell, also called the inner vessel, having a complex shape with a certain number of penetrations for housing the pumps and intermediate exchangers. The intermediate exchangers are mostly immersed in the hot header, in which the sodium-sodium exchangers of the auxiliary circuits for evacuating the residual power are also housed.

BRIEF SUMMARY OF THE INVENTION

According to this invention, by adopting a cylindrical inner vessel it is possible to immerse the main intermediate exchangers and the auxiliary sodium-sodium exchangers of the residual power evacuation circuits in the cold header, with considerable advantages as far as concerns rapid initiation of natural circulation of the primary sodium in the main circuit and of the secondary sodium in the auxiliary circuits for evacuation of the residual power.

Furthermore, the volume of the cold header is decidedly greater, and this increases considerably the heat capacity and thermal inertia of the primary fluid.

There are various known solutions for reactors with cylindrical inner vessels, but the intermediate exchanger feed systems are generally unsatisfactory.

This invention calls for feeding the intermediate exchangers through a transverse duct solid with the cylindrical inner vessel, and which leads directly into a special feed bell installed on the intermediate exchangers themselves.

BRIEF DESCRIPTION OF THE DRAWINGS

FIGS. 2 and 3 refer to a reactor block with a cylindrical inner vessel and intermediate exchangers of sodium-air a traditional type, implemented according to this invention.

FIGS. 4 and 5 refer to a reactor block with a cylindrical inner vessel, implemented according to this invention and with intermediate exchangers of the type with raised upper tube plates, implemented according to the Italian Pat. Appln. 12555A/88 of Sept. 27, 88 by the same owner.

DESCRIPTION OF THE PREFERRED EMBODIMENT

Figure 1:
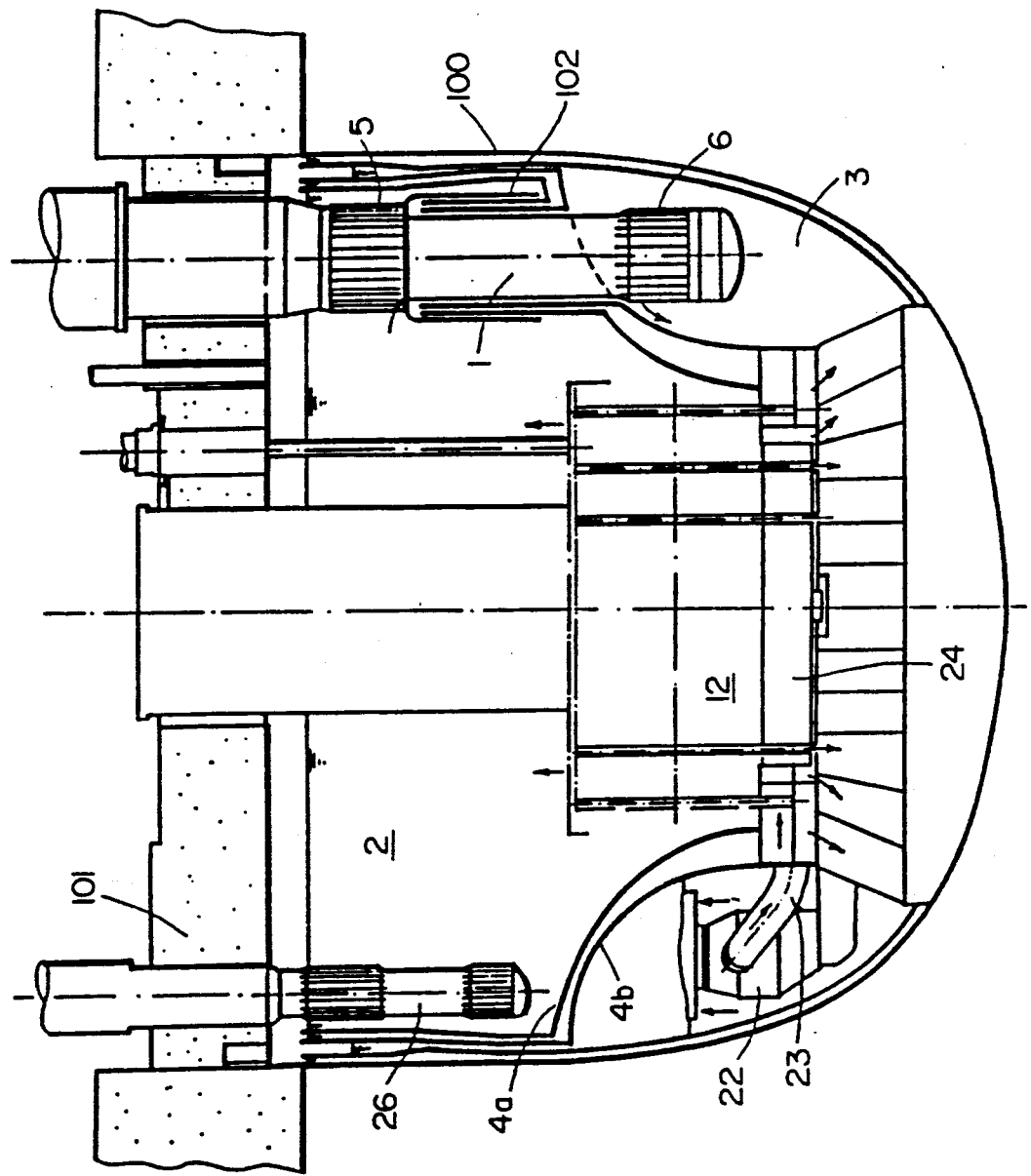
FIG. 1 is a schematic cross-section of a traditional reactor block, with an inner vessel separating hydraulically the hot and cold headers; the vessel has a complex shape and has hollow cylindrical bodies protruding into the hot header for the primary components (pumps and intermediate exchangers).

For the sake of simplicity, equivalent elements in the various figures have been indicated using the same reference numbers. With specific reference to FIG. 1, 100 is the main vessel of the reactor, the inner chamber of which is divided up into hot upper header 2 and a cold lower header 3, by means of a hydraulic separation structure 4, consisting of a metal shell, variously shaped, which can also be double-walled, 4a and 4b, as shown in FIG. 1, and which hereinafter will be called the inner vessel to distinguish it from the main vessel 100 defined above.

The main vessel 100 is closed at the top by a ceiling 101 crossed through by suitable holes for the various components of the nuclear reactor. In particular this ceiling 101 is crossed through by the bodies of a suitable series of intermediate sodium-sodium heat exchangers, indicated as 1, and by a suitable series of auxiliary exchangers 26, which intervene in the event of a reactor shutdown to help the intermediate exchangers 1 dispose of the residual power of the reactor.

In known reactors of the type illustrated in FIG. 1, the inner vessel 4 (4a and 4b in the case under reference) has hollow cylindrical bodies 102 protruding into the hot header 2, in which the intermediate exchangers 1 are housed. The intermediate exchangers 1 must form a hydraulic connection between the hot header 2 and the cold header 3. For this reason, in the solutions with a hydraulic separation structure 4 having a complex shape as illustrated in FIG. 1, they straddle the inner vessel with the upper window 5 immersed in the hot header 2 and the lower window 6 immersed in the cold header 3.

Using a cylindrical inner vessel 7 the intermediate exchangers 1 are completely immersed in the cold header 3. There is therefore the problem of how to feed them with the primary sodium from the hot header 2. According to the invention and as illustrated in FIGS. 2 to 5, the connection between the hot header 2 and the intermediate exchanger 1 is created by means of a suitably sized and shaped, transverse duct 13 welded to the inner cylindrical vessel 7 and connected by means of a mechanical seal 14 to an input distributor 15 integrated in the exchanger.

From the distributor 15, the sodium flows into a feeder bell 16 installed on top of exchanger 1, to which it is directed through the upper input window 5. The transverse duct 13, the input distributor 15 and the feeder bell 16 are an extension of the hydraulic separation structure between the hot header 2 and the cold header 3. The mechanical seal 14 must be maintained as close against heat exchanger 1 as possible, to allow its disassembly and removal through the plug 18 of the main vessel 19.

The differential heat expansions between the plug of the main vessel 100 and the cylindrical inner vessel 7 act in such a way as to increase the primary sodium tightness on the mechanical seal, determining a contact pressure sufficient to ensure the required limited and controlled leakage rate.

The intermediate exchanger 1 is solid with the plug 101 of the main vessel 100, while the transverse feeder duct 13 is solid with the cylindrical inner vessel 7. At the time of cold assembly, that is to say at a relatively low temperature, evenly distributed throughout the whole reactor block, the intermediate exchanger 1 is positioned so as to bring the interfacing elements of the mechanical seal 14 into contact, and it is then secured in respect of plug 101 of the main vessel 100. Under working conditions, when powered, when the tigh-test sealing is required, the temperature of the hot header 2 and of the cylindrical inner vessel 7 is higher than the average temperature of the plug 101, so that the heat expansion on the diameter of the cylindrical inner vessel 7 is greater than the heat expansion of the plug 101, and therefore also of the expansion on the assembly diameter of the heat exchangers themselves.

Thus the transverse feed duct 13 presses against the elastic element of the mechanical seal 14 and a contact pressure develops on the interfacing elements. By chosing a suitable stiffness of said elastic element, it is possible to obtain the required sealing.

It must be noted that this solution may be applied both to traditional intermediate exchangers 1 (FIGS. 2 and 3) and to intermediate exchangers (8) with raised upper tube plates, on condition, of course, that an intake system into the feeder bell 16 is provided (FIGS. 4 and 5).

So as to avoid problems due to the common causes of failure of intake systems, exchangers with a second auxiliary emergency input window 20 as per a contemporary invention by the same proprietor may be used. The plant engineering solution according to this invention is particularly well suited for evacuating residual heat by natural circulation, even without taking into account the presence of the main secondary circuits.

Let us consider the primary circulation. The primary pumps 22 suck the sodium out of the cold header 3 and force it into a suitable duct 23 leading to a collecting structure 24 located below the supporting grid of the fuel elements. The sodium flows through the core 12 extracting the latter's thermal power, and flows out to collect in the hot header 2. Through the transverse duct 13, the sodium enters the input distributors 15 of the intermediate exchangers 1 and 8 and from these into the feeder bell 16, which convey it towards the upper input windows 5. After crossing the tube bundle axially, where it gives up its thermal power to the secondary fluid, the sodium leaves through the lower window 6 and collects in the cold header 3, waiting to be sucked up again by the pumps 22.

The improvements in the natural primary circulation are mainly due to the fact that intermediate exchangers 1 and 8 are completely immersed in the cold header 3.

Whatever the situation there will always be a substantial exchange of heat by conduction through the outer walls 25 of exchangers 1, 8 between the hot primary sodium contained inside exchanger 1, 8 itself and the sodium in the cold header.

Let us assume the simultaneous stoppage of all the primary pumps 22 and the failure of the main heatsink consisting of the main secondary circuits, and consider the incidental transient phenomena which follow.

In a first phase the inertia of the pumps 22 is sufficient to keep the primary sodium circulating at a sufficiently high rate to extract all the decay power in spite of the fact that this reaches its maximum values during the first instants. Once the energy of the pumps 22 has exhausted itself, sufficient natural circulation is still guaranteed by the motive power generated in intermediate exchangers 1, 8. This power is consequent to the hydraulic head generated by the mass of primary sodium contained inside exchangers 1, 8 and cooled by the exchange of heat through the outer walls 25 of exchangers 1, 8 themselves, immersed in the cold header 3. This motive power is available from the very instant t=0 when the transient phenomenon starts, and is sufficient to initiate and maintain a sufficient natural circulation independently of any added draft effect created inside the intermediate exchangers 1, 8, but due this time to the main secondary circuits, thanks to the thermal inertia of their steam generators.

In the known solutions for reactor blocks with complex-shaped inner vessels 4 penetrated by primary components (pumps, intermediate exchangers), this latter effect due to the secondary circuits is indispensable in order to prove, for example, that following a transient phenomenon due to a power failure the temperatures reached are not sufficient to compromise the integrity of the structures or of the fuel elements.

The solution put forward by the invention, therefore, makes it possible to free the secondary circuits from safety tasks. All this refers to the removal of heat from the core. Let us now consider how the residual power extracted may be disposed of safely. In the initial moments the reactor is thermally insulated, and the heat extracted from the core cannot help increasing the temperature of the sodium in the cold header. But based on the characteristics of this invention, the latter has a high heat capacity, and in this initial phase it is able to absorb the decay power, acting as a heatsink in the place of the secondary circuits.

This cannot go on for very long, however, as the primary circuit would soon reach saturation. It is therefore necessary to start natural circulation rapidly in the secondary residual power evacuation circuits. In the solution covered by this invention the sodium-sodium exchangers of the residual power evacuation circuits are immersed in the cold header, according to a variant of a previous invention by the same proprietor (Italian patent application no. 12468A/86 dated Apr. 21st 1986). The whole residual power evacuation circuit is thus at the same temperature as the cold header.

Following the thermal isolation of the core, the temperatures of the two headers (hot and cold) tend to meet. In particular the temperature of the cold header rises. The temperature of the sodium contained in the sodium-sodium exchanger therefore also rises, and this creates a hydraulic head capable of initiating spontaneously natural circulation in the residual power evacuation circuits. At this point the decay heat may be disposed of in the outside air, through the unit heaters. The removal of heat from the cold header 3 thereofore allows the natural circulation in the primary circuit to stabilize.

What I claim is:

1. Reactor block of a fast reactor for evacuation of the residual power of the core comprising:
   a vessel containing sodium
   a core of fuel elements mounted in the vessel
   a hydraulic separation means for dividing said vessel into a cylindrical inner vessel containing said core and a central upper hot header located above said core and an annular outer vessel containing a cold header located around and below the hot header;
   a pump for feeding sodium contained in the cold header towards the bottom of the core of fuel elements;
   an intermediate heat exchanger immersed in the cold header including an upper inlet window, a lower outlet window and a shell surrounding and extending axially along the upper portion of the intermediate exchanger creating an annular distributor located in between the inlet and outlet windows and a bell extending axially from the distributor to the upper inlet window for feeding the upper inlet window;

a transverse duct mounted on the hydraulic separation means for communicating the hot header to the distributor, mechanical sealing means fixed to the distributor for resiliently coupling by a pressure contact the transverse duct and the distributor and lying within the profile of the intermediate heat exchanger.

2. Reactor block of a fast reactor according to claim 1, wherein said transverse duct is welded at one end to the hydraulic separation means and engages at its other end said sealing means, sealing pressure between the transverse duct and said mechanical sealing means being achieved by heat expansion differential between said duct and hydraulic separation means on one hand and the shell of the exchanger immersed in the cold header on the other hand.

3. Reactor block of a fast reactor according to claim 2, characterized by the fact that the mechanical sealing means located between the transverse duct and said shell is an elastically yielding sealing element.

4. Reactor block of a fast reactor for evacuation of the residual power of the core comprising:

a vessel containing sodium;

a core of fuel elements mounted in the vessel;

a hydraulic separation means for dividing said vessel into a cylindrical inner vessel containing said core and a central upper hot header located above said core and an annular outer vessel containing a cold header located around and below the hot header;

a pump for feeding sodium contained in the cold header towards the bottom of the core of fuel elements;

an intermediate heat exchanger immersed in the cold header including an upper inlet window, a lower outlet window and a shell surrounding and extending axially along the upper portion of the intermediate exchanger creating an annular distributor located in between the inlet and outlet windows and a bell extending axially from the distributor to the upper inlet window for feeding the upper inlet window;

a transverse duct mounted on the hydraulic separation means for communicating the hot header to the distributor; and mechanical sealing means for resiliently coupling the transverse duct and the distributor.

* * * * *